(12) United States Patent
Welker

(10) Patent No.: US 7,813,218 B2
(45) Date of Patent: Oct. 12, 2010

(54) PERFORMING QUALITY CONTROL WITH RESPECT TO POSITIONING OF SURVEY HARDWARE

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 12/168,119

(22) Filed: Jul. 5, 2008

(65) Prior Publication Data

US 2010/0002537 A1   Jan. 7, 2010

(51) Int. Cl.
*G01V 1/38* (2006.01)
(52) U.S. Cl. ........................................... 367/19
(58) Field of Classification Search .................. 367/16, 367/19, 20
See application file for complete search history.

(56) References Cited

U.S. PATENT DOCUMENTS

| | | | | |
|---|---|---|---|---|
| 4,404,664 A * | 9/1983 | Zachariadis | .................. | 367/19 |
| 5,790,472 A * | 8/1998 | Workman et al. | ............. | 367/19 |
| 6,470,246 B1 * | 10/2002 | Crane et al. | .................. | 701/21 |
| 6,691,038 B2 * | 2/2004 | Zajac | .......................... | 702/14 |
| 7,336,560 B2 * | 2/2008 | Rekdal et al. | .................. | 367/15 |
| 2007/0064526 A1 * | 3/2007 | Holo | ............................ | 367/15 |

OTHER PUBLICATIONS

Watt, "A new QC approach for 4D seismic surveys using towed streamer acquisition", First Break, vol. 26, May 2008.*
O'Keefe, et al., Global Availability and Reliability Assessment of the GPS and Galileo Global Navigation Satellite Systems, Canadian Aeronautics and Space Journal, Jun. 2002, pp. 123-132, vol. 48, No. 2.
Ryan, et al., Marine Positioning Multiple Multipath Error Detection, The Hydropraphic Journal, Apr. 2001, Issue 100.
Rizos, Outlier Testing and Residuals, http://www/gmat.unsw.edu.au/snap/snap/gps/gps_survey/chap9/915.htm, 1999.
Gauss-Markov Theorem, From Wikipedia, the free encyclopedia, http://en.wikipedia.org/wiki.Gauss%E2%80%93Markov_theorem, 2008.
MOVE3 Geodetic Network Software-Integrated Adjustments of Geodetic Observations, http://www/navtechgps.com/supply/move3.asp, Grontmij, 2008.

* cited by examiner

*Primary Examiner*—Jack Keith
*Assistant Examiner*—Krystine Breier

(57) ABSTRACT

To perform quality control with respect to positioning of survey hardware, survey navigation data is acquired regarding components of the survey hardware used to perform a survey operation with respect to a subterranean structure. Error statistics according to the survey navigation data are determined in real time. An action is effected in response to the error statistics.

24 Claims, 3 Drawing Sheets

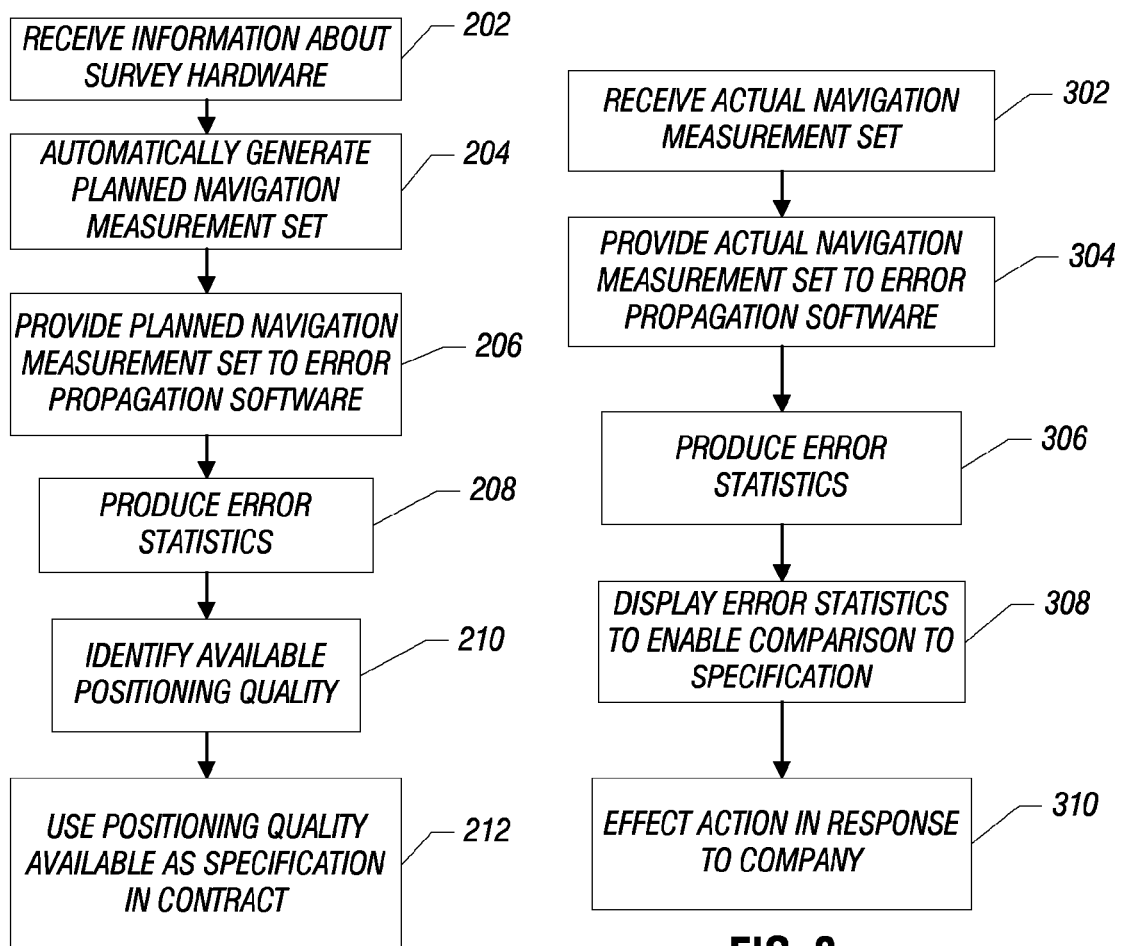

PERFORMING QUALITY CONTROL WITH RESPECT TO POSITIONING OF SURVEY HARDWARE

TECHNICAL FIELD

The invention relates generally to performing quality control with respect to positioning of survey hardware.

BACKGROUND

Surveying, including electromagnetic surveying or seismic surveying, is used to perform characterization of subterranean elements in a subterranean structure. Examples of subterranean elements of interest include hydrocarbon-bearing reservoirs, fresh water aquifers, gas injection zones, and other subterranean elements. Seismic surveying is performed by deploying seismic sources (e.g., air guns, vibrators, explosives, etc.) and seismic receivers (e.g., geophones, hydrophones, etc.). The seismic sources are used to produce seismic waves that are propagated into the subterranean structure, with some of the seismic waves reflected from subterranean elements of interest. The reflected seismic waves are received by the seismic receivers.

Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

In a marine survey environment, survey hardware components (e.g., sources and receivers) can be towed through a body of water. Typically, during acquisition of survey data, limits can be set for acceptable levels of positioning precision/accuracy measures. If any of the limits are exceeded (meaning that positioning quality measures cannot achieve the desired limits), then troubleshooting can be performed, which may involve reprocessing or even re-acquisition of survey data. This typically involves manual analysis in which an operator attempts to drill down into various information to find the source(s) of the problem.

In some conventional techniques, quality control (QC) statistics and other quality measures regarding positioning of survey hardware equipment can be delivered to a user on and/or off line, after acquisition of the survey data. The statistics and other quality measures can then be analyzed to determine if improper positioning of survey components may result in poorly acquired survey data. However, an issue associated with such analysis of QC statistics and measures regarding positioning precision/accuracy is that, if the statistics and measures do not show agreement with the expected values, then it may be necessary to re-acquire the survey data, which is very expensive.

Further, the expectations may not be realistic, causing confusion and extra work for both navigators and client QC representatives with respect to whether the position quality is adequate. In the worst case, the survey line(s) may be reacquired unnecessarily due to a poor understanding of what should be achievable.

In addition, any delay in validation of position estimates results in a delay in producing a fast track image, a preliminary unrefined image of the reservoir that is the target of the survey.

With the advent of full streamer acoustic networks, the number of acoustic measurements has grown to the point that even experts in adjustment computations are overwhelmed by the statistical analysis used in previous conventional networks including a few tens of measures. Full streamer acoustic networks include from a few hundred to thousands of acoustic ranges, often above 10,000 ranges in the case of IRMA networks. Such networks are practically impossible to troubleshoot for the typical navigator onboard today's seismic vessels. Another factor that aggravates this situation is the recent growth in seismic activity. This growth has resulted in an acute lack of expertise throughout the industry.

Because of the complexity of full streamer acoustic networks, the typical planner, both pre-survey and during the survey, cannot easily determine the optimum set of measurements in the context of typical failure situations. Due to an inability to visualize what to do, the normal approach to ensuring success is along the lines of more is better. Planners often deploy the wrong amount of equipment, either too much of a non-critical type or too little of the most critical type, because it is practically impossible to know the sensitivity of a particular spread to all measurements that could be made available. In some cases planners or ship personnel will attempt to meet a practically impossible specification by deploying as much equipment as possible. Only after the data is acquired and analyzed does it become clear that the goal was not possible without economically impractical means, such as additional vessels. What is not obvious is changes in survey accuracy with the shape of a spread. With the advent of full streamer acoustic networks, in particular IRMA networks, the seismic industry realized that the shape of the spread was a major factor in the positioning accuracy possible. Long skinny spreads have a weakness in the mid streamer area, furthest from the GPS control points. Spreads with shorter streamers and/or larger streamer separations become squarer, and thus have an improvement in the geometric distribution of positioning information.

SUMMARY

In general, according to an embodiment, a method of performing quality control with respect to positioning of survey hardware includes acquiring, substantially in real time, survey navigation data regarding components of the survey hardware used to perform a survey operation with respect to a subterranean structure. Realistic error statistics and other measures are also determined substantially in real time according to the survey navigation data. An action is effected in response to the error statistics and other measures.

Other or alternative features will become apparent from the following description, from the drawings, and from the claims.

BRIEF DESCRIPTION OF THE DRAWINGS

FIG. 2 is a flow diagram of a process of determining available positioning quality for survey hardware and defining a specification based on the determined available positioning quality, according to an embodiment.

FIG. 3 is a flow diagram of a process of performing quality control with respect to positioning of survey hardware, according to an embodiment.

DETAILED DESCRIPTION

Figure 1:
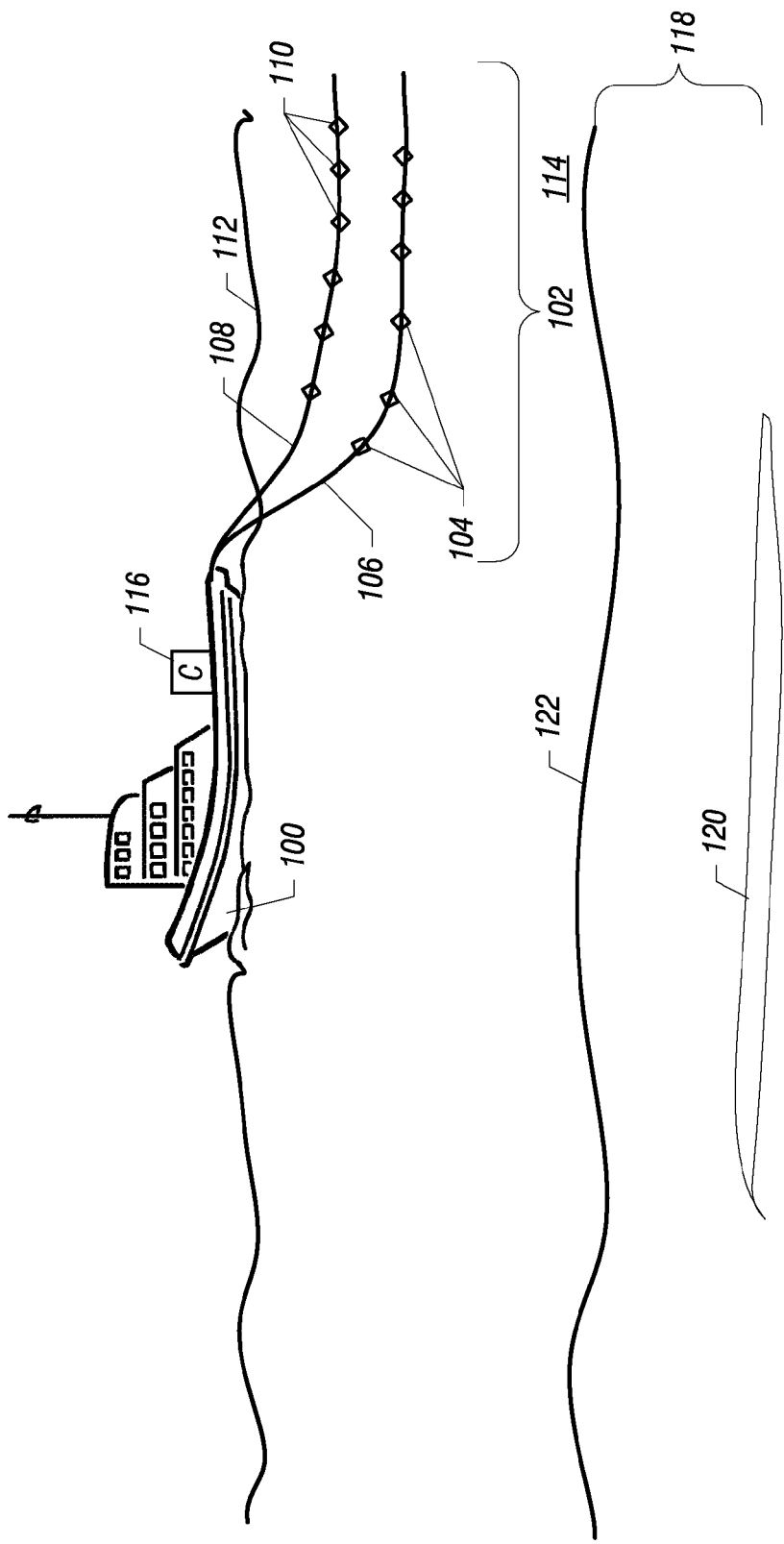
FIG. 1 illustrates an example arrangement to perform a marine surveying operation, according to an embodiment.

In the following description, numerous details are set forth to provide an understanding of the present invention. However, it will be understood by those skilled in the art that the present invention may be practiced without these details and that numerous variations or modifications from the described embodiments are possible.

Some embodiments of the invention graphically automate the interpretation of complicated positioning quality measures regarding positioning of survey hardware equipment. The automated technique translates the meaning of the quality measures into practical information that can be used to make intelligent decisions by users (e.g., navigators) regarding how a potential failure or current failure of marine survey equipment can be remedied. In addition, the real limits of the marine survey system can be understood without costly inefficient trial-and-error methods, as conventionally performed.

An issue addressed by some embodiments of the invention is that the quality measures computed in near real time are distinguished from quality measures that are expected. The difference between obtained quality measures and expected quality measures is mapped in real time to the difference between expected and obtained positioning measurements, and then further to the hardware that either is planned to supply the missing positioning measurements or additional hardware that could supply adequate additional positioning measurements. A subtle advantage to having this insight is that in the best case, the deployed positioning hardware offers alternative ways for meeting a positioning specification. Thus a user can choose which available hardware to replace or repair based on its accessibility in the marine environment.

There are three components of expectation in the measurement domain: (1) the number of measurements, (2) the geometric distribution of measurements, and (3) the precision of the measurements. These three components can be expressed as statistical quality measures that are used to determine the quality of positioning. The user can then see in a very large system of measurements, which are practically impossible to manually sort through in near real time, a clear picture of why the quality measures do not agree with expected measures. The three components of expectation in the measurement domain combine to produce quality measures.

For example, a point in a large acoustic network that is missing a large percentage of distance measurements may not fall below the pre-shot or pre-survey expectation or acceptable level. This can be because the remaining measurements have a better precision than were expected pre-shot or pre-survey, as the measurement precision can be determined in near real time, and vary based on actual acoustic condition that are different from the pre-survey expectation. Had the user monitored just the number of measurements missing compared to the pre-survey plan, they could have interpreted the information as an indication that the position estimates did not meet the specified quality measures even if they actually had. In conventional networks, the number of acoustic measurements of each node is often a pre-survey specification and can lead to confusion in the post-acquisition analysis.

Similarly, if one of the GPS (global positioning system) control points located on front and tail buoys fails for some reason, the impact may or may not be significant, depending on how many GPS control points remain. If the predominance of failures is on one side of the spread, the network can become uncontrolled on that side. Replacing just a subset of the failed control points may bring the quality control measures back into the specified limits. In one embodiment, the navigator/user can export the current spread picture to a separate planning display and interactively remove or simulate failure of any of the measurements that are currently present to see the impact of this failure before it occurs. This information can be used to determine where to make repairs of failed hardware in weak portions of the spread before that portion of the spread experiences the critical failures that will degrade the quality measures to an unacceptable degree.

Alternatively, the user can virtually repair failures (by performing simulations) in the exported version of the current spread at a particular shot to see how these repairs will impact the position QC (quality control) measures that have fallen to an unacceptable level. This is important since during a survey, limited opportunities exist for such repairs as they are most efficiently done in a workboat, rather than by bringing the spread onboard, which is requires much more time. Workboat limitations include safe operating weather conditions, an inability to conduct workboat operations safely in the dark, and limited qualified workboat operators. In addition, a limited number of hardware spares onboard makes it optimum to use the spares where they will give the most benefit.

At the same time, a trend indicating measurement failure in either a portion of the survey area or a portion of the survey spread can alert the user that the pre-survey expectation in some way will soon not be realistic. In one embodiment of the invention, software projects the current spread shape forward in time and space to an area with a different expected measurement set, due to a different acoustic environment for example. Knowledge of the acoustic environment, or more correctly the measurement set possible in this environment, may have been acquired during a previous line of the ongoing survey or previous surveys in this area and now incorporated into the expectation analysis.

Another example can be that a larger number of acoustic ranges are available compared to the pre-survey expectation but the geometric distribution is degraded due to the shape of the spread. Deformations of the spread can occur for example due to currents and vessel maneuvers. The changed geometric distribution may make the predominance of positioning information in a particular direction and leave the orthogonal direction poorly determined.

Consideration of the spread shape is one aspect of some embodiments of the invention, as previously only a nominal parallel straight streamer shape was considered in any planning stage. For more recent azimuth rich acquisition methods such as spiral and coil shooting and shooting through turns, changes in the relations between transmitters and receivers are significant. These geometric distribution variations must be considered both in the pre-survey stage and in near real time to evaluate quality measures.

FIG. 1 illustrates an example arrangement of a marine environment in which a marine vessel 100, traveling on a sea surface 112, is able to tow survey hardware 102 in a body of water 114. The survey hardware 102 includes tow cables 106, 108, on which are deployed various components 104, 110, respectively. The components 104, 110 can be any combination of survey sources and survey receivers. The survey sources can be seismic survey sources (e.g., air guns, vibrators, explosives, etc.), or electromagnetic (EM) sources (e.g., electric or magnetic dipole transmitters), and the receivers can be seismic receivers (e.g., geophones, hydrophones), or EM receivers (e.g., EM dipole receivers).

The survey hardware 102 is configured to perform a survey operation with respect to a subterranean structure 118 that includes one or more subterranean bodies of interest 120. The subterranean structure 118 is located below a sea floor 122.

The survey sources propagate signals (seismic signals or EM signals) into the subterranean structure 118. The signals are reflected from the one or more subterranean bodies 120 for receipt by receivers in the survey hardware 102.

The marine vessel 100 also has a controller 116 to perform processing of information associated with the survey hardware 102. Information received by the controller 116 can include navigation data from various sensors in the survey hardware 102. The sensors of the survey hardware are considered as being part of the navigation measurement equipment of the survey hardware. Examples of navigation data (also referred to as a navigation measurement set) include compass readings, GPS position data, distances between components, inertial measurement information (such as information collected by accelerometers), streamer direction information, distances of sources and receivers from tow cables, and so forth. Such navigation data can be converted into position coordinates of various components of the survey hardware 102.

In accordance with some embodiments, the controller 116 is able to receive (substantially in real-time) navigation data from various sensors in the survey hardware 102. Acquiring (or receiving) the navigation data substantially in real-time refers to the navigation data being received from the survey hardware 102 while the survey hardware 102 is still being deployed in the body of water 114 for performing a survey operation. The controller 116 can in turn process the navigation data substantially in real-time, which refers to processing of such navigation data while the survey hardware 102 remains deployed in the body of water 114.

Based on the processing of the navigation data, the controller 116 is able to produce error statistics. Such error statistics can then be used for effecting some action, such as to cancel a survey operation, detect that a potential problem is about to occur such that remedial action can be taken, or some other action. Note that since the navigation data is processed substantially in real-time, remedial action can involve any one or more of re-processing of survey data collected by the survey hardware 102, or causing re-acquisition of survey data by the survey hardware 102 while the survey hardware 102 is still deployed in the body of water 114. The above procedure is referred to as a quality control procedure with respect to navigation data collected by the controller 116.

In this manner, quality control with respect to positioning of survey hardware can be performed "online," which means that the quality control is performed while the survey hardware 102 is still deployed in the body of water 114. This compares with conventional techniques in which processing of navigation data is performed offline, such that detection of any positioning issues will result in having to re-deploy survey hardware or to perform some other time-consuming remedial action.

Another aspect of some embodiments is the ability to determine the positioning quality that is available such that the positioning quality available can be used as a specification in a contract (agreement) formed between a survey operator (who is operating and possibly the owner of the survey hardware 102) and a customer of the survey operator.

FIG. 2 shows an example process of determining an available positioning quality for particular survey hardware, and using such determined available positioning quality as a specification in a contract to be used for indicating whether positioning of the survey hardware is within the contract specification.

Information is received (at 202) about the survey hardware, such as survey hardware 102 in FIG. 1. According to the survey hardware, a planned navigation measurement set is automatically generated (at 204), such as by software. The software can be part of a pre-survey planning tool. Note that the planned navigation measurement set is the ideal or probable navigation measurement set for the given survey hardware. The generated planned navigation measurement set can be produced from a model of the survey hardware. Note that such model can be updated once the survey hardware is actually deployed into the body of water, since configurations of the survey hardware may have changed between a planning stage and when the survey hardware is actually deployed into a body of water. The planned navigation measurement set represents the geometrical relation of the navigation measurement equipment of the survey hardware and the accuracy of the measurements they will produce. Later, actual navigation data is obtained substantially in real time, where the actual navigation data represents the latest actual geometrical relations, and actual measurement data. In real time, different expectations are determined, due to any difference in the planned versus actual geometry of the spread (e.g., curved streamers instead of straight due to un-planned turns or current induced feather), and a comparison can be made regarding how well the measurements fit together compared to how they were expected to fit together based on the measurement accuracy expectation. Based on the comparison, an operator may change expectations of measurement accuracy for one or more measurements or types of measurements.

Next, the planned navigation measurement set is provided to error propagation software, which can be an off-the-shelf error propagation software or a customized error propagation software. The error propagation software produces (at 208) error statistics such as those used in Best Linear Unbiased Estimates (BLUES) data snooping techniques. These include residuals, standardized residuals, two-dimensional error ellipses or three-dimensional error ellipsoids, marginally detectable errors (MDE), external reliability, estimated biases, and global and partial variance factors. These statistics are derived in response to the planned navigation measurement set.

Some of the statistics (least squares statistics) are discussed below.

Standardized residuals are residuals that are normalized to the standard distribution. Thus the probability that they belong to the normal distribution can be quantified. Hypothesis for whether measurements located further out on the tail of the distribution can be formulated and tested to give a likelihood for whether or not the measurement should be used. This is classic data snooping and outlier removal. This method is commonly used in today's seismic navigation software but typically in systems of equations where the number of observations is small, a few hundred for example. The reason for this is that typically, in systems of thousands of acoustic range measurements, such as an IRMA acoustic network, classical data snooping both takes too long, both in near real time and offline, and removal of outliers has a small effect when there are so many other valid observations present.

A component of an embodiment of the invention is to improve classical data snooping by isolating those unknowns that are not well controlled or over determined. Coordinate pairs (nodes) in the system of equations that have fewer observations can be more sensitive to outliers than those with more observations. Rejection of outliers for these nodes can be automated to give improvement to their position estimates.

The estimated bias is derived by removing an observation from the solution and comparing the measured observation to the same value computed from the solution. In the case of acoustic ranges for example, one range is removed from a system of thousands of ranges and the solved distance between the transition point and the receiver point is compared to the measured acoustic range. The resulting value can be averaged over a period of time for which the acoustic range is thought to be time stationary, and the average can be thought of as the bias of this measurement over that time.

The Marginally Detectable Error (MDE) is an expression for the smallest error that can be detected in any one measurement with a certain probability. The more over determined a set of unknowns is, the smaller the MDE will be. For example, if the unknown is a single distance and only one measurement is available, an error in that measurement cannot not be statistically computed. The resulting MDE would be infinitely large. As the number of measurements of the distance increases, the magnitude of the error that can be detected with a certain probability decreases and is a function of both the number of measurements and the precision of the measurement device.

In a large system of unknowns, MDEs are also referred to as internal reliability. This means the smaller the MDE typical throughout the system of equations, the more reliable the system of equations. Measurements with relatively large MDEs indicate an area of the network where fewer measurements are available.

External reliability is computed by projecting the MDE for each measurement into the solution domain. Typically the MDE that causes the largest ER value is the measurement that should be augmented to increase the reliability of the node under consideration and the network in general. In the example for a one-dimensional distance from above, the MDE for a particular distance measurement is already projected into the solution domain and internal reliability is identical to external reliability. This means for a measurement with an MDE of one meter, the external reliability for that measurement is one meter. Typical use of this statistic is to project the MDE that gives the largest external reliability in the unknown space. For a system of two-dimensional unknowns, an external reliability for both of the axes can be computed. Those coordinate directions that have a large external reliability are the unknowns that are poorly controlled or in other words, least over determined.

A simple example can be made for a large acoustic network with thousands of distance measurements well distributed over the network. Because all of the unknowns are very over determined, the MDEs are on the order of 1 to 2 meters. The whole system of acoustic ranges and unknowns is in reference to the marine vessel that provides the GPS reference coordinate system. The MDE of the GPS antenna on the marine vessel is 3-4 meters in any direction. Thus every unknown coordinate in the acoustic network gets its largest external reliability from the GPS antenna.

Error statistics (such as those discussed above) are used (at 210) to identify the positioning quality that can be provided by the navigation measurement equipment of the survey hardware. The positioning quality available is then used (at 212) as a specification in a contract established between a survey operator and a customer of the survey operator. In some implementations, the specification of available positioning quality in the contract is under-specified such that some loss of accuracy in navigation data can occur before positions being estimated are out of specification.

After the contractual specification has been established, online quality control can be performed in the field, as depicted in FIG. 3. An actual navigation measurement set is received (at 302) from navigational survey hardware. The actual navigation measurement set includes navigation data received from sensors of the survey spread 102 of FIG. 1. The receipt (or acquisition) of the actual navigation measurement set is performed substantially in real-time. The actual navigation measurement set is then provided (at 304) to error propagation software, which in turn produces (at 306) error statistics according to the actual navigation measurement set.

Some embodiments of the invention automatically or interactively drill down to identify the measurement(s) and related hardware that are responsible for not meeting the pre-survey expectations or short term changes in statistical quality measures. This can be accomplished by comparing the pre-survey or pre-shot set of least squares statistics to those computed for the current shot. The external reliability for nodes can reveal which unknowns are missing critical measurements, resulting in changes from the last shot, or changes in a planned measurement set.

The online quality control procedure also displays (at 308) the produced error statistics (e.g., external reliabilities) to the contractual specification (containing expected error statistics) to enable a comparison of the error statistics to the contractual specification. Such error statistics can be related to the navigation measurement equipment of the survey hardware. An action can then be effected (at 310) in response to the comparing, where the effected action can include one or more of the following if the specification is violated: the survey operation can be cancelled; a remedial action can be taken to fix the error positioning problem; a potential problem can be detected, particularly in the case where the contractual specification exceeds what is required to achieve positioning accuracy; and/or other actions.

For example, after identifying where the external reliability is not as expected, the next step is to look at the measurements/hardware that gave the changed external reliability and other changes in the statistical quality measures. This is one example of relating error statistics to the navigational hardware. It may be useful to augment missing measurements. If for example the node has an increased external reliability in the cross-line direction, one or more acoustic measurements with a significant cross-line component with respect to the node under consideration are relevant. The set of acoustic ranges that were present or planned when the external reliability and SMA (Semi-Major Axis if the 2 dimensional error ellipse) were acceptable shall be differenced with the current less complete set and one or more transmitters responsible for these ranges can be identified. A subset of the ranges in the difference obtained can be virtually introduced one at a time until an acceptable external reliability and SMA is reached.

Alternatively, the newly introduced measurements can originate from a transmitter (associated with a measurement device) not in the original plan, either not yet deployed or already deployed but not activated. Transmitters are often deployed but not activated since too many simultaneous transmissions can be seen as noise on the acoustic positioning recordings.

The algorithm can perform a search by virtually turning on one or more transmitters until an acceptable level is reached for the statistical quality measures. Once the transmitted ranges that will bring the quality indicators back to acceptable levels are identified, the user can take actions to put the hardware in place that will supply these ranges.

Another feature of some embodiments of the invention is to display trends to the user which indicate changes in the quality indicator statistics with either space or time. The trends can be used in various ways. While progressing along a survey line if the computations indicate a negative trend the software can either interactively or automatically search for improvements that can mitigate the trend. In addition the trends can be logged to a GIS (geographic information system) type data base for use later in the survey.

While the above example uses acoustic distances, any measurement type in a seismic or EM positioning network can be treated in exactly the same way. These measurement types include GPS control points, compasses, light sensors, etc.

Further, some embodiments of the invention reveal less intelligent methods for obtaining the same result. In a more computationally straightforward way, the set of measurements present in a previous measurement set, either pre-survey or pre-shot, can be different from a current set of measurements. The previous measurements can be reintroduced into the current set of measurements with no regard to how likely they are to be relevant. Other intermediate methods include computing a percentage of cross-line component, the cross-line component to radial distance ratio, or only considering those ranges that meet the percentage of ranges that are considered relevant.

In addition to least squares statistics, other measures can be used to identify problems in the positioning network and such measures can be used to identify nodes in trouble. These nodes can then be compared in the measurement domain for measurements present before the node was designated as in question.

Some embodiments of the invention graphically represents these computations by presenting to the user what the computation indicates. In some embodiments of the current invention, the network graphical display shows which parts of the spread a change in positioning hardware would bring the network back to within specification could be located. Examples of such hardware include acoustic transmitters, compasses, global navigation satellite systems (GNSS), control points, typically on tail or front floats but also aboard separate vessels, AUVs, and ROVs. In other embodiments, the user is presented with measurements that are distinguished by a least squares statistical value such as a standardized residual, estimated bias, MDE, or nodes that give SMAs, or external reliabilities that exceed a threshold established from a pre-survey plan or a value recently obtained based on a particular hardware configuration used in the seismic data acquisition spread with the objective of revealing exactly what is different and allowing the user to understand not just what is different, but what is critically different.

In addition, the graphical display is designed to show the user how to augment the current set of measurements to meet the pre-survey expectations as efficiently as possible.

Note that the effected action can also include displaying a graphical representation of the survey hardware (e.g., 102 in FIG. 1). The graphical representation can depict components of the survey hardware based on coordinates of the components (computed from the navigation data). Moreover, the graphical representation can include color indicators or other indicators to indicate which components have positions that are outside of specification. For example, a components having a first color (e.g., green) are components whose positions are within specification; components having a second color (e.g., yellow) are components whose positions are marginal with respect to the specification; and components having a third color (e.g., red) are components whose positions are outside of specification.

An additional aspect of some embodiments is the ability to spatially vary acquisition conditions. The pre-survey planning tool can be used to simulate performance based on expected acoustic performance conditions, GPS availability, and magnetic anomalies. Varying conditions can be based on both survey history and models developed from measurements.

Also, varying positioning performance specifications may be acceptable during the course of a surveying operation. Typically, a customer may seek a specification that is optimum before the fact, but the customer may settle for a lower specification if existing conditions prevent the pre-survey ideal.

Figure 4:
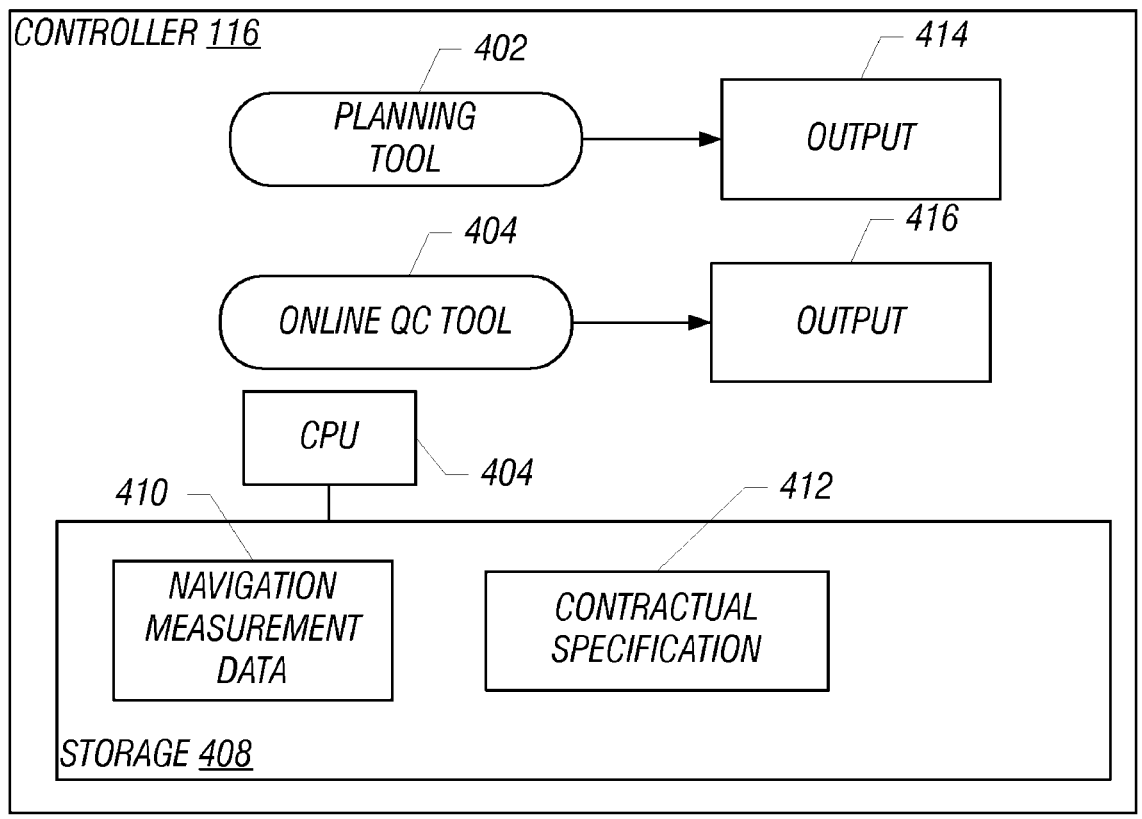
FIG. 4 is a block diagram of a computer including modules for performing tasks according to some embodiments.

FIG. 4 shows an example controller 116, which can be implemented as a computer in one example. The controller 116 includes a pre-survey planning tool 402 to perform the planning tasks depicted in FIG. 2. The controller 116 also includes an online QC tool 404 to perform the online QC procedure of FIG. 3. The planning tool 402 and online QC tool 404 can be implemented as software executable on one or more central processing units (CPUs) 406.

The CPU(s) 406 is (are) connected to a storage 408, which can store navigation measurement data 410 (as received from sensors of the survey hardware 102 of FIG. 1) and a contractual specification 412 which was determined using an output 414 of the planning tool 402. Based on the online QC procedure performed by the online QC tool 404, an output 416 can be provided by the online QC tool 404, which can include, as examples, indications of violations of the contractual specification 412, indications of potential positioning problems, and so forth.

Instructions of software such as the planning tool 402 and online QC tool 404 are loaded for execution on a processor (such as the one or more CPUs 406 in FIG. 4). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of performing quality control with respect to positioning of survey hardware, comprising:
   acquiring, substantially in real-time, survey navigation data regarding components of the survey hardware used to perform a survey operation with respect to a subterranean structure;
   determining, substantially in real-time, error statistics according to the survey navigation data;
   relating the error statistics to navigation measurement equipment in the survey hardware;
   determining if any action is required based on the error statistics;
   effecting an action in response to the error statistics indicating violation of a specification, wherein the specification is generated based on planned navigation data generated using a model of the survey hardware; and
   simulating failure of one or more components of the navigation measurement equipment to determine impact of the failure of the one or more components of the navigation measurement equipment before the failure occurs,
   wherein effecting the action is based on the determined impact.

2. The method of claim 1, wherein effecting the action comprises performing a remedial action in response to the error statistics indicating violation of the specification.

3. The method of claim 2, further comprising:
   performing pre-planning to determine the specification.

4. The method of claim 3, wherein performing the pre-planning comprises:
   receiving information about the survey hardware;
   generating the planned navigation data for the survey hardware, wherein the planned navigation data represents a geometrical relation of the navigation measurement equipment and accuracy of measurements to be produced by the navigation measurement equipment; and
   producing error statistics in response to the planned navigation data,
   wherein the specification is based on the error statistics produced based on the planned navigation data.

5. The method of claim 4, wherein producing the error statistics in response to the planned navigation data comprises applying the planned navigation data to error propagation software, wherein the error propagation software produces the error statistics based on the planed navigation data.

6. The method of claim 5, wherein acquiring substantially in real-time the survey navigation data comprises acquiring the survey navigation data from sensors of the survey hardware, the method further comprising:
applying the acquired navigation data to the error propagation software to produce the error statistics according to the acquired navigation measurement data.

7. The method of claim 1, further comprising modifying the model after deploying the survey hardware.

8. The method of claim 1, wherein performing the survey operation comprises performing a marine survey operation.

9. The method of claim 1, wherein effecting the action comprises detecting that a potential problem with respect to positioning of one or more components of the survey hardware is about to occur.

10. The method of claim 1, further comprising computing coordinates of components of the survey hardware based on the survey navigation data, wherein the survey navigation data includes data from sensors including one or more compasses, one or more global positioning system sensors, and one or more accelerometers.

11. The method of claim 10, further comprising displaying a graphical representation of the components of the survey hardware based on the coordinates.

12. The method of claim 11, further comprising assigning colors to the components in the graphical representation according to whether positions of the components are within or outside the specification accompanied by a graphical presentation of navigation measurement equipment that is responsible for being out of the specification.

13. The method of claim 1, wherein effecting the action comprises selecting one of plural available hardware components in the survey hardware to address an issue identified by the error statistics.

14. A method of performing quality control with respect to positioning of survey hardware, comprising:
acquiring, substantially in real-time, survey navigation data regarding components of the survey hardware used to perform a survey operation with respect to a subterranean structure;
determining, substantially in real-time, error statistics according to the survey navigation data;
relating the error statistics to navigation measurement equipment in the survey hardware;
determining if any action is required based on the error statistics;
effecting an action in response to the error statistics; and
performing simulation to virtually repair a part of the survey hardware to determine whether such repair will address an issue identified by the error statistics.

15. The method of claim 1, further comprising graphically presenting a trend to indicate changes in the error statistics in either space or time.

16. A computer comprising:
a processor to:
receive, substantially in real-time, survey navigation data regarding components of survey hardware used to perform a survey operation with respect to a subterranean structure;
determine, substantially in real-time, error statistics according to the survey navigation data;
relate the error statistics to navigation measurement equipment in the survey hardware;
determine if any action is required based on the error statistics indicating violation of a specification, wherein the specification is generated based on planned navigation data generated using a model of the survey hardware; and
simulate failure of one or more components of the navigation measurement equipment to determine impact of the failure of the one or more components of the navigation measurement equipment before the failure occurs,
wherein determining if any action is required is based on the determined impact.

17. The computer of claim 16, wherein the action comprises a remedial action to be effected in response to the error statistics indicating violation of the specification.

18. The computer of claim 16, wherein the survey operation is a marine survey operation.

19. The computer of claim 16, wherein the action comprises detecting that a potential problem with respect to positioning of one or more components of the survey hardware is about to occur.

20. The computer of claim 16, wherein the processor is to further compute coordinates of components of the survey hardware based on the survey navigation data, wherein the survey navigation data includes data from sensors including one or more compasses, one or more global positioning system sensors, and one or more accelerometers.

21. The computer of claim 20, further comprising a display device to display a graphical representation of the components of the survey hardware based on the coordinates.

22. The computer of claim 21, wherein the processor is to further assign colors to the components in the graphical representation according to whether positions of the components are within or outside the specification accompanied by a graphical presentation of navigation measurement equipment that is responsible for being out of the specification.

23. The computer of claim 16, wherein the action comprises selecting one of plural available hardware components in the survey hardware to address an issue identified by the error statistics.

24. A computer comprising:
a processor to:
receive, substantially in real-time, survey navigation data regarding components of survey hardware used to perform a survey operation with respect to a subterranean structure;
determine, substantially in real-time, error statistics according to the survey navigation data;
relate the error statistics to navigation measurement equipment in the survey hardware;
determine if any action is required based on the error statistics; and
perform simulation to virtually repair a part of the survey hardware to determine whether such repair will address an issue identified by the error statistics.

* * * * *